US011529839B2

(12) United States Patent
Kiefer

(10) Patent No.: US 11,529,839 B2
(45) Date of Patent: Dec. 20, 2022

(54) DEVICE FOR DECOUPLING VIBRATIONS BETWEEN TWO SYSTEMS AND THE WORKING MACHINE

(71) Applicant: HYDAC Systems & Services GmbH, Sulzbach (DE)

(72) Inventor: Timo Kiefer, Saarlouis (DE)

(73) Assignee: HYDAC SYSTEMS & SERVICES GMBH, Sulzbach (DE)

( * ) Notice: Subject to any disclaimer, the term of this patent is extended or adjusted under 35 U.S.C. 154(b) by 357 days.

(21) Appl. No.: 16/771,342

(22) PCT Filed: Dec. 17, 2018

(86) PCT No.: PCT/EP2018/085189
§ 371 (c)(1),
(2) Date: Jun. 10, 2020

(87) PCT Pub. No.: WO2019/129519
PCT Pub. Date: Jul. 4, 2019

(65) Prior Publication Data
US 2020/0346509 A1 Nov. 5, 2020

(30) Foreign Application Priority Data
Dec. 30, 2017 (DE) .................... 10 2017 012 140.0

(51) Int. Cl.
*B60G 17/06* (2006.01)
*B60G 13/00* (2006.01)
(Continued)

(52) U.S. Cl.
CPC .......... *B60G 17/06* (2013.01); *B60G 13/003* (2013.01); *B60G 99/002* (2013.01);
(Continued)

(58) Field of Classification Search
CPC .... B60G 17/06; B60G 13/003; B60G 99/002; B60G 2202/25; B60G 2400/0531;
(Continued)

(56) References Cited

U.S. PATENT DOCUMENTS 6,070,681 A * 6/2000 Catanzarite ........ B62D 33/0608
180/89.15
6,115,658 A 9/2000 Ahmadian et al.
(Continued)

FOREIGN PATENT DOCUMENTS

DE 10 2005 005 723 8/2006
DE 10 2013 204 024 9/2014
(Continued)

OTHER PUBLICATIONS

International Search Report (ISR) dated Apr. 17, 2019 in International (PCT) Application No. PCT/EP2018/085189.

*Primary Examiner* — Toan C To
(74) *Attorney, Agent, or Firm* — Wenderoth, Lind & Ponack, L.L.P.

(57) ABSTRACT

A device together with an assigned working machine for decoupling vibrations between two systems (2, 4) in the form of spring-mass oscillators, of which one system (2) is assigned to a motion machine and the other system (4) is assigned to an operator operating the motion machine. The other system (4) at least partially performs motions about a transverse axis (Q) during driving motions of the motion machine and in doing so is subject to vertical motions in the direction of a vertical axis (z) at an absolute vertical speed ($v_{z1,1}$) serving as an input variable of control devices and/or regulating devices. Those devices control a damping system (8) of the one system (2) and/or the other system (4) to compensate for the vibrations. The respective pitch motion of the other system (4) is detected by at least one rotation rate sensor. The respective measured value ($\omega_1$) of the
(Continued)

sensor, preferably amplified by only a predeterminable factor ($L_1$), results in the absolute vertical speed ($v_{z1,1}$) as input variable.

19 Claims, 2 Drawing Sheets

(51) Int. Cl.
  *B60G 99/00* (2010.01)
  *F16F 15/00* (2006.01)
  *F16F 15/02* (2006.01)
  *B62D 33/06* (2006.01)
  *B62D 33/077* (2006.01)

(52) U.S. Cl.
  CPC .......... *F16F 15/002* (2013.01); *F16F 15/022* (2013.01); *B60G 2202/25* (2013.01); *B60G 2400/0531* (2013.01); *B60G 2400/0532* (2013.01); *B60G 2400/252* (2013.01); *B60G 2500/10* (2013.01); *B60G 2600/172* (2013.01); *B62D 33/0604* (2013.01); *B62D 33/077* (2013.01)

(58) Field of Classification Search
  CPC ...... B60G 2400/0532; B60G 2400/252; B60G 2500/10; B60G 2600/172; F16F 15/002; F16F 15/022; B62D 33/0604; B62D 33/077
  USPC ........................................... 180/89.13, 89.14
  See application file for complete search history.

(56) References Cited

U.S. PATENT DOCUMENTS

| | | | | |
|---|---|---|---|---|
| 6,206,121 | B1* | 3/2001 | Michel | B62D 33/0604 296/190.07 |
| 6,273,203 | B1* | 8/2001 | Paggi | B62D 33/0608 280/6.154 |
| 6,439,651 | B1* | 8/2002 | Johansson | B62D 33/067 296/190.07 |
| 6,898,501 | B2* | 5/2005 | Schubert | B60G 17/0195 381/71.4 |
| 7,077,226 | B2* | 7/2006 | Oliver | B62D 33/0608 280/5.514 |
| 7,077,227 | B2* | 7/2006 | Oliver | B62D 33/0608 280/5.514 |
| 8,371,562 | B2* | 2/2013 | Knevels | F16F 15/022 267/64.27 |
| 9,216,778 | B1* | 12/2015 | Safiejko | B62D 33/0608 |
| 9,982,413 | B2* | 5/2018 | Paolini | B62D 33/0617 |
| 10,343,729 | B2* | 7/2019 | Benevelli | B62D 33/0604 |
| 10,442,475 | B2* | 10/2019 | Wagner | B62D 33/0608 |
| 10,549,796 | B2* | 2/2020 | Helm | B62D 33/0617 |
| 10,668,954 | B2* | 6/2020 | Payne | B62D 33/077 |
| 11,173,969 | B2* | 11/2021 | Soldan | B60G 15/063 |
| 11,203,383 | B2* | 12/2021 | Manternach | B62D 33/0604 |
| 2002/0033288 | A1* | 3/2002 | Okazawa | B62D 33/0604 180/89.14 |
| 2003/0226700 | A1* | 12/2003 | Peddycord | B62D 33/0604 180/89.13 |

FOREIGN PATENT DOCUMENTS

| | | |
|---|---|---|
| DE | 20 2017 104 785 | 9/2017 |
| EP | 1 018 445 | 7/2000 |
| FR | 2 888 781 | 1/2007 |

* cited by examiner

DEVICE FOR DECOUPLING VIBRATIONS BETWEEN TWO SYSTEMS AND THE WORKING MACHINE

FIELD OF THE INVENTION

The invention relates to a device for decoupling vibrations between two systems in the form of spring-mass oscillators, of which one system is assigned to a motion machine and the other system is assigned to an operator operating the motion machine. The other system at least partially performs motions about a transverse axis during driving motions of the motion machine and in doing so is subject to vertical motions in the direction of a vertical axis at an absolute vertical speed. The vertical motion serves as an input variable of control devices and/or regulating devices, which control a damping system of the one and/or other system to compensate for the vibrations.

BACKGROUND OF THE INVENTION

From EP 1 018 445 A2 an assembly is known, which comprises a first element, a second element and a controllable suspension system, which has a controllable damper arranged between the first and the second elements and a control system comprising an acceleration sensor for detecting acceleration values of the first element and a displacement sensor for detecting values of the distance between the first and the second element. By an integrator the values detected by the acceleration sensor are integrated, yielding the absolute speed $v_{abs}$ of the first element. The values detected by the displacement sensor are differentiated by a filter, yielding the relative speed $v_{rel}$ between the first and the second element.

The control system further comprises a control unit, which determines a desired damping force $F_{desired}$ of the controllable damper based on a control strategy for which the absolute speed $v_{abs}$ and the relative speed $v_{rel}$ are used as inputs. According to the control strategy, in particular when the product of the signal $v_{abs}$ and the signal $v_{rel}$ is greater than or equal to zero, the desired damping force $F_{desired}$ is equal to a product of an amplification G, the signal $v_{abs}$ and a function dependent on the variables absolute speed $v_{abs}$ and relative speed $v_{rel}$.

In a preferred embodiment, the first element comprises a seat and the second element comprises a frame, to which the seat is connected.

Acceleration sensors regularly have an offset, which is integrated during the integration of the values detected by the acceleration sensor and results in a drift of the signal of the detected absolute speed $v_{abs}$, i.e. in an error of this signal. In addition, the signal of the relative speed $v_{rel}$, which is determined by a derivation of the signal detected by the displacement sensor, is generally noisy. When using a faulty signal of absolute speed $v_{abs}$ and a noisy signal of relative speed $v_{rel}$, the signal of the desired damping force $F_{desired}$, determined from these signals is also faulty and/or noisy.

In practice, high-pass filtering is used to attempt to correct the drift and/or error of the absolute speed and low-pass filtering is used to attempt to reduce the noise of the relative speed. However, the respective filtering of the respective velocity results, in particular independently of the respective other filtering, in a distortion of the signal of this speed in the form of an offset of the phase of the determined speed signal, which is to be corrected on an individual basis.

SUMMARY OF THE INVENTION

Based on this state of the art, the invention addresses the problem of improving the known device, while of simple form, it causes decoupling of a system from another system such that, in the event of vibrations of the one system, the other system remains vibration-free by compensating these vibrations with a high degree of accuracy.

A device for decoupling vibrations solving this problem has the respective pitch motion of the other system detected by at least one rotation rate sensor. The respective measured value of the rotation rate sensor, preferably is amplified by only a predeterminable factor to result in the absolute vertical speed as an input variable for the subsequent system actuation.

Because in the device according to the invention an rotation rate sensor is used to determine the angular velocity of the other system, the angular velocity can be obtained directly from the sensor, namely without, in particular prior, complex arithmetic operations. Furthermore, according to the invention, the absolute vertical speed results directly, in particular, amplified only by a predeterminable factor, from the angular velocity detected by the rotation rate sensor, so that in this respect at most a less complex amplification is required. In comparison to the state of the art, no integration of the measured values detected by the acceleration sensor is necessary to obtain the absolute speed, by which integration the offset of the acceleration sensor is integrated resulting in a drift of the absolute speed.

The simple construction of the device and the low number of required components, results in a determination of the absolute vertical speed, which is easy to prepare. By providing at most a simple amplification, the determination is less error-prone, thereby increasing the accuracy of the vibration compensation.

The rotation rate sensor according to the invention can be formed as a Micro-Electro-Mechanical System (MEMS), which is a micromechanical sensor, having in particular at least one plate specifically excited to vibrate and can be based on the Coriolis principle. For sensors formed in this way, the Coriolis force acts on the MEMS when the rotation rate sensor rotates. The reaction of the MEMS to this excitation is individually detected in three dimensions based on the rotational motion.

Micromechanical sensors have the advantage that they are commercially available at low cost. Preferably the rotation rate sensor integrated in the "HIT 1500" product of HYDAC Electronic GmbH is used as the rotation rate sensor.

In a preferred embodiment, the other system can perform rolling motions around its longitudinal axis when the motion machine is moving and, in doing so, be subject to further vertical motions in the direction of the vertical axis at a further absolute vertical speed. This further absolute vertical speed serves as a further input variable for the control and/or regulating devices. In this way, in addition to the pitch motions of the other system about its transverse axis, the device according to the invention can also compensate for rolling motions of the other system about its longitudinal axis. The further absolute vertical speed can be superimposed on the absolute vertical speed and both speeds can, in particular, add up to an absolute total vertical speed.

The predeterminable factor can be derived from the minimum distance of the transverse axis to a point of the other system. The absolute vertical speed of that point is determined, and/or from the minimum distance of the longitudinal axis to a further point of the other system. The further absolute vertical speed of that further point is determined, preferably the factor corresponds to the respective minimum distance. The point may also correspond to the further point. The respective point of the other system in terms of a spot on the other system is fictitious and is an integral part of the other system. A hardware-implemented or software-implemented amplifier is used to determine the product of the factor and the angular velocity determined by the rotation rate sensor, to which amplifier the respective angular velocity detected by the rotation rate sensor is supplied on the input side. That amplifier amplifies this angular velocity by the individual factor, resulting in the absolute vertical speed or the further absolute vertical speed in the direction of the vertical axis. In this way, the absolute vertical speed or further absolute vertical speed can be determined in a particularly simple manner using inexpensive technical hardware-implemented or software-implemented means.

The point of the other system, the absolute vertical speed of which is determined, and/or the further point of the other system, the further absolute vertical speed of which is determined, may be located at a respective end of the other system movable in the direction of the vertical axis. Such a positioning of the point at the relevant, in particular outermost, end moving in the direction of the vertical axis during a pitching or rolling motion has the advantage that the distance between the transverse axis or the longitudinal axis and this point is at a maximum, so that the factor by which the respective angular velocity detected by the rotation rate sensor is amplified, i.e. by which the respective angular velocity is multiplied, is also at a maximum, resulting in the highest possible values, and thus, meaningful values of the absolute speed and/or further absolute vertical speed being obtainable. An amplifier can be provided for determining the absolute vertical speed and/or a further amplifier can be provided for determining the further absolute vertical speed.

The damping system is controlled as a function of positive and negative absolute speed values and/or further absolute vertical speed values. Thus, when the respective end of the other system, which end can be moved in the direction of the vertical axis and on which other system the respective point is located, moves away from the one system, the rotation rate sensor detects a positive angular velocity. The determined respective absolute vertical speed then is also positive. When the respective end of the other system, which end can be moved in the direction of the vertical axis and on which other system the respective point is located, moves towards the one system, however the rotation rate sensor detects a negative angular velocity. The determined absolute vertical speed and/or further absolute vertical speed then is also negative.

The other system can be pivotably articulated, preferably one end thereof, to the one system about the transverse axis or the longitudinal axis. Also, preferably the other end of the other system can be connected to the one system via at least one damper system. It is also conceivable that the other system is connected to the one system exclusively via, in particular four, damper systems. Where damper systems are provided exclusively, the transverse and the longitudinal axes of the other system pass through a center of gravity of the other system and of the device, to which the other system is attached, if applicable.

A relevant damper system can be formed as a spring-mass damper system. A spring-mass damper system is characterized in that a damper and a spring are arranged between a mass and a further mass or a fixed point. The spring dampens passively, whereas the damper can be designed as a semi-active or active damper.

With a semi-active damper, the desired damping effect is achieved by changing its damping coefficient. Active and semi-active damping systems have the advantage over passive damping systems that the damping of the damper can be adapted to the respective operating state of the system in which the damper is used. Semi-active damping systems have the advantage over active damping systems, in which energy must be supplied to a damper formed as an actuator, of lower energy requirements and a less complex regulating system for the damper. The control and/or regulating strategy for controlling the damper can be based at least partially on the Skyhook approach. Particularly preferably, the damping system is formed as a semi-active damping system, which is controlled by a regulating strategy based on the Skyhook approach. However, there is also the possibility to implement an active spring-damper system.

A single rotation rate sensor can be provided to detect the pitching motion and the rolling motion. It is also conceivable that one rotation rate sensor is provided for detecting the pitching motion and a further rotation rate sensor is provided for detecting the rolling motion. In any case, the respective rotation rate sensor detects at least the angular velocity of a pitching motion of the other system about its transverse axis and/or the rolling motion of the other system about its longitudinal axis.

The one system may be connected to the motion machine, and the other system may be connected directly or indirectly to a "cockpit" that can be used by the operator for controlling the motion machine.

The subject of the invention is also a working machine, in particular an agricultural working machine, preferably a tractor. A motion machine has a "cockpit" that can be used by an operator for controlling the motion machine, and a device for decoupling vibrations between the one system assigned to the motion machine, in particular connected to the motion machine, and the other system assigned to the cockpit, in particular directly or indirectly connected to the cockpit.

By the device according to the invention, vibrations of the motion machine and impacts emitted by the motion machine can be effectively decoupled from the cockpit of the motion machine, in particular the driver's cab, so that the cockpit remains largely free of vibrations and free of impacts during operation of the working machine. In this way, it is ensured that the vibrations and impacts do not have a negative effect on the health of a person operating the working machine.

The physical background of the device according to the invention is explained in more detail below:

This present invention is based on the physical principle that when a point moves on a circle, the tangential or circular velocity v of the point on the circle is equal to the product of the angular velocity $\omega$ and the radius of the circle r, wherein the angular velocity $\omega$ is equal to the derivative of the angle of rotation $\varphi$ with respect to time t:

$$v = \omega * r = \frac{d\varphi}{dt} * r = \dot{\varphi} * r$$

Applied to the present invention, the point is a point of the other system, not situated on the transverse axis for a pitching motion about the transverse axis, or a point of the other system, not situated on the longitudinal axis for a rolling motion about the longitudinal axis. If the device according to the invention is inactive or not provided, the working machine, excited by vibrations of the other system, performs a pitching motion about the transverse axis or rolling motion about the longitudinal axis in the form of a motion on a pitch circle track of the circle about the respective transverse or longitudinal axis, in which the center of the circle is located. However, these vibrations have a low amplitude in comparison with the radius of the circle r, which describes the distance between the center of the circle and the point of the other system on the circle, so that the point moves back and forth on a very short section of the circular path. In this case the absolute vertical velocity $v_{z,1}$ in the direction of the vertical axis z can be approximated by the tangential or circular speed v of the point, wherein L corresponds to the radius r and describes the distance between the center of the circle on the transverse or longitudinal axis and the point of the other system on the circle:

$$v_{z,1} \approx v = \omega * L = \frac{d\varphi}{dt} * L = \dot{\varphi} * L$$

Below a device according to the invention and a working machine having a corresponding device are explained in more, Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure and that are not to scale.

DETAILED DESCRIPTION OF THE INVENTION

Figure 1A:
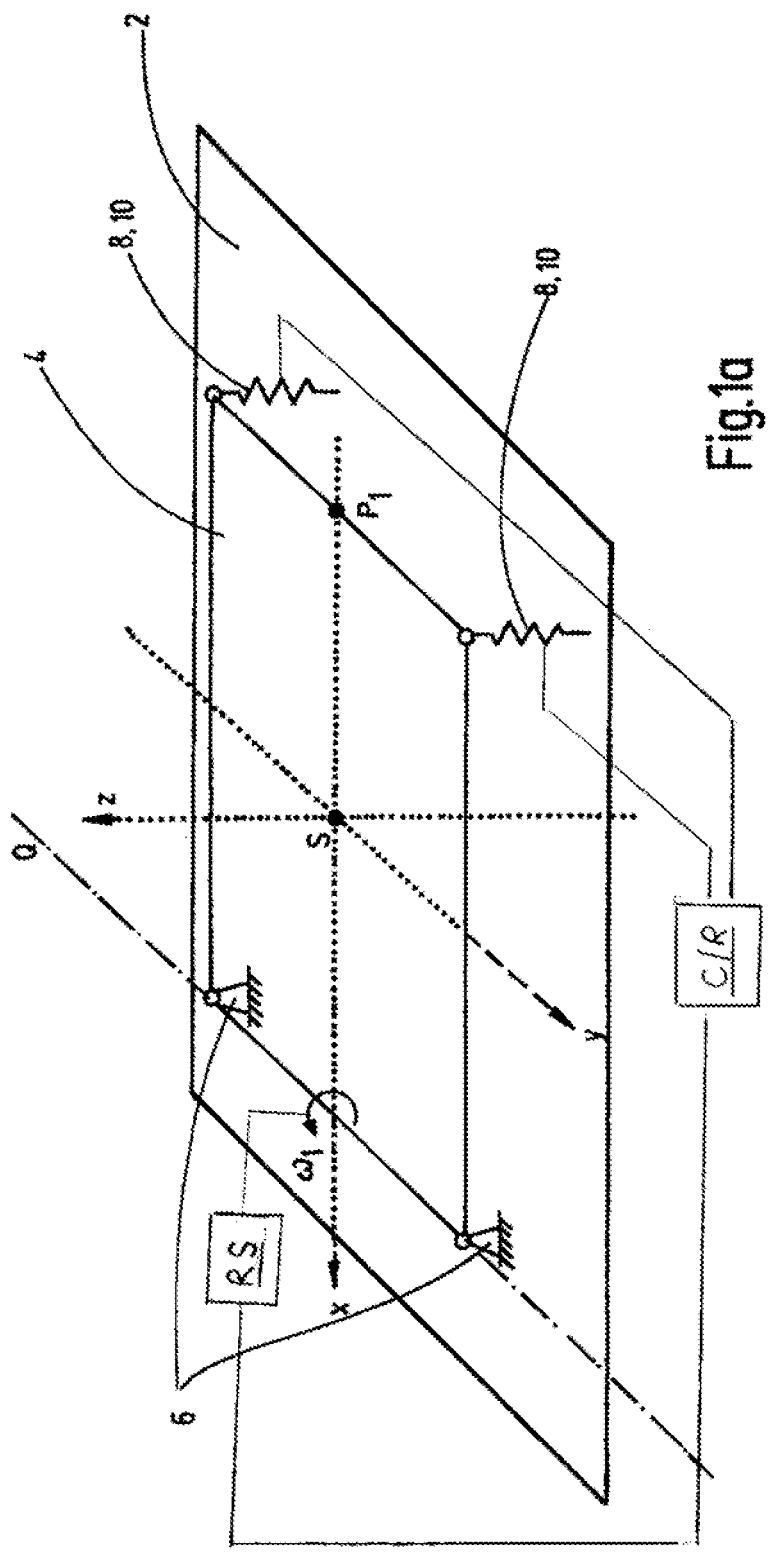
FIGS. 1a and b each show a schematic, perspective and principle representation of the device according to the invention, with each provided with different designations.

As FIGS. 1a and b show, the device according to the invention comprises two systems 2, 4 in the form of spring-mass oscillators. One system 2 is connected to a motion machine of a working machine. The other system 4 is connected to a driver's cab of the machine having a cockpit for controlling the motion machine. The working machine, the motion machine, the driver's cab and the cockpit are not shown in the figures. At its end facing the front of the machine, the other system 4 is articulated pivotably about a transverse axis Q at two articulation points 6 to the one system 2. At its end facing the rear of the working machine, the other system 4 is connected to the one system 2 via two damping systems 8 in the form of a semi-active spring-damper system each. The respective spring-damper system comprises a spring 10 and a damper not shown in the figures. On the other system 4 or on the driver's cab a rotation rate sensor RS for detecting angular velocity values is arranged.

FIG. 1a shows the device according to the invention in an object related coordinate system (body frame) x, y, z, the origin of which is located in the center of gravity S of the other system and the driver's cab.

Figure 1B:
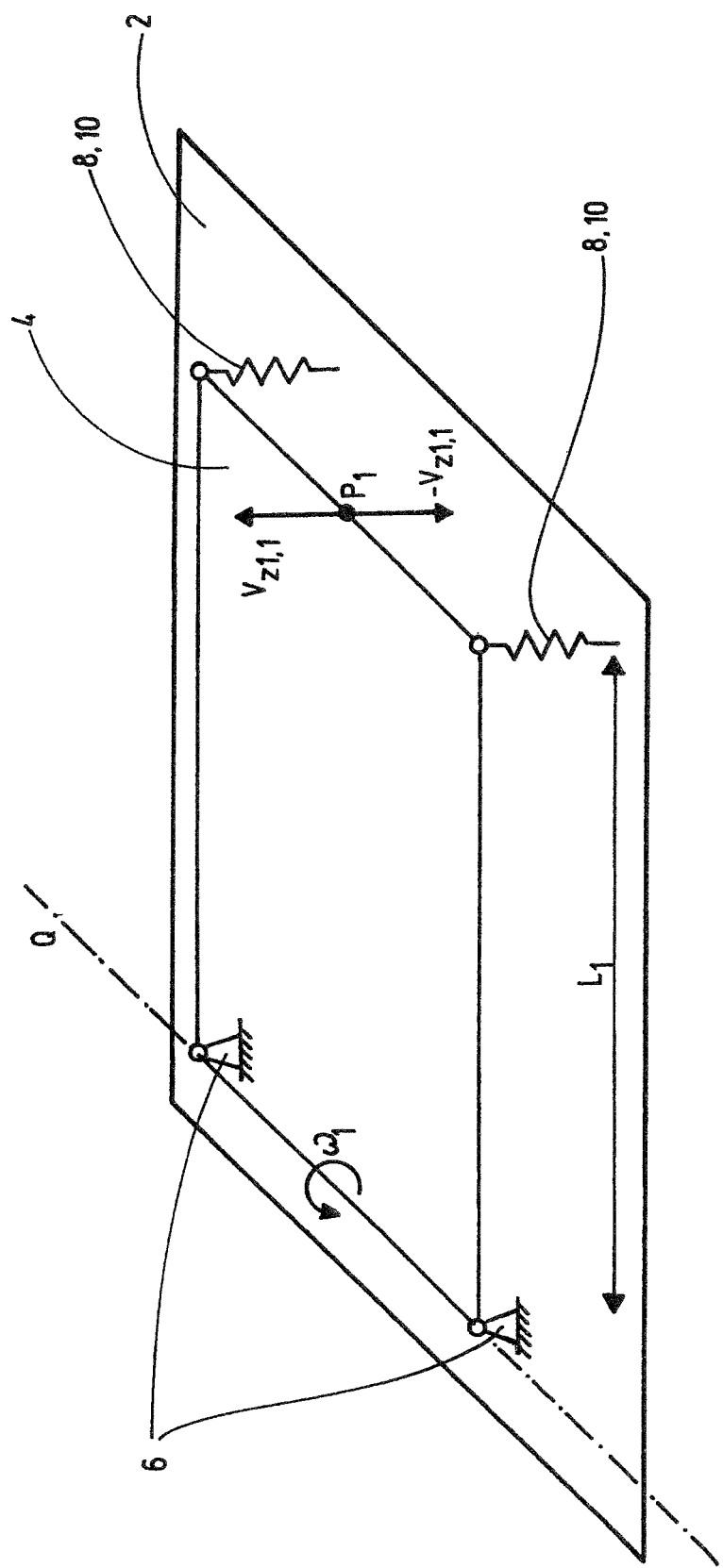

In particular, when the motion machine moves, the other system can perform 4 pitching motion about the transverse axis Q. In this process, the rotation rate sensor RS detects the values of the angular velocity $-\omega_1$, $\omega_1$ of the other system 4 about the transverse axis Q, at which the end of the other system 4 facing the rear of the working machine moves towards the one system 2 or moves away from the one system 2 and in this process, in particular, performs a vertical motion in the direction of a vertical axis z at a negative $-v_{z1,1}$ or positive $v_{z1,1}$ absolute vertical velocity (FIG. 1b). The absolute vertical velocity results from the product of the angular velocity $-\omega_1$, $\omega_1$ values detected by the rotation rate sensor and a factor in the form of the minimum distance $L_1$ (FIG. 1b) of the transverse axis Q from a point $P_1$ (FIG. 1a) of the other system 4, the absolute vertical velocity $v_{z1,1}$ of point $P_1$ is determined. Therefore, a hardware-implemented or software-implemented amplifier is used to amplify the values of the angular velocity $\omega_1$ detected by the rotation rate sensor RS. In FIG. 1a, the point $P_1$ of the other system 4, whose absolute vertical velocity $v_{z1,1}$ is determined, is located at the outermost end of the working machine facing the rear of the working machine.

The absolute vertical velocity $v_{z1,1}$ determined in this way is fed to a control and/or regulating device C/R, which actuates the damping systems 8 to compensate for the vibrations of the other system 4 by a regulating strategy according to the Skyhook approach depending on the absolute vertical velocity $v_{z1,1}$ and in this way to decouple the systems vibrations from each other. In an embodiment not shown in more detail, the respective articulation point 6 is formed by a spring and/or damper system, comparable to the system designated by 8 in the figures.

While one embodiment has been chosen to illustrate the invention, it will be understood by those skilled in the art that various changes and modifications can be made therein without departing from the scope of the invention as defined in the claims.

The invention claimed is:

1. A device for decoupling vibrations between two systems (2, 4) in the form of spring-mass oscillators, of which one system (2) is assigned to a motion machine and the other system (4) is assigned to an operator operating the motion machine, which other system (4) at least partially performs motions about a transverse axis (Q) during driving motions of the motion machine and in doing so is subject to vertical motions in the direction of a vertical axis (z) at an absolute vertical speed ($v_{z1,1}$), which serves as an input variable of control devices and/or regulating devices, which actuate a damping system (8) of the one (2) and/or the other (4) system to compensate for the vibrations, characterized in that the respective pitch motion of the other system (4) is detected by at least one rotation rate sensor, a respective measured speed value ($\omega_1$) of the rotation rate sensor results in the absolute vertical speed ($v_{z1,1}$) as input variable.

2. The device according to claim 1, characterized in that the predeterminable factor can be derived from the minimum distance ($L_1$) of the transverse axis (Q) to a point ($P_1$) of the other system (4), the absolute vertical speed ($v_{z1,1}$) of which is determined.

3. The device according to claim 2, characterized in that the point ($P_1$) of the other system (4), the absolute vertical speed ($v_{z1,1}$) of which is determined, located at a respective end of the other system (4) movable in the direction of the vertical axis (z).

4. The device according to claim 1, characterized in that the other system (4) is pivotably articulated at articulation points (6) on the one system (2) about the transverse axis (Q), and the damping system (8) is provided between the other system (4) and the one system (2).

5. The device according to claim 4, characterized in that the articulation points (6) are on one end of the one system (2).

6. The device according to claim 1, characterized in that at least an angular velocity ($\omega_1$, $\omega_2$) of the respective pitching motion of the other system (4) about the transverse (Q) can be detected by the respective rotation rate sensor.

7. The device according to claim 1, characterized in that the damping system (8) is formed as a semi-active or active spring-damper system.

8. The device according to claim 1, characterized in that the one system (2) is connected to the motion machine and the other system (4) is connected directly or indirectly to a cockpit that can be used by the operator for controlling the motion machine.

9. A working machine, in particular an agricultural machine, having a motion machine, having a cockpit, which can be used by an operator to control the motion machine, and having a device for decoupling vibrations between one system (2) assigned to the motion machine and another system (4) assigned to the cockpit, according to claim 1.

10. The device according to claim 1, characterized in that the respective measured value ($\omega_i$) of the rotation rate sensor is amplified by only a predeterminable factor ($L_1$).

11. A device for decoupling vibrations between two systems (2, 4) in the form of spring-mass oscillators, of which one system (2) is assigned to a motion machine and the other system (4) is assigned to an operator operating the motion machine, which other system (4) at least partially performs rolling motions about a longitudinal axis (Q) during driving motions of the motion machine and in doing so is subject to vertical motions in the direction of a vertical axis (z) at an absolute vertical speed ($v_{z1,1}$), which serves as an input variable of control devices and/or regulating devices, which actuate a damping system (8) of the one (2) and/or the other (4) system to compensate for the vibrations, characterized in that a respective rolling motion of the other system (4) is detected by at least one rotation rate sensor, a respective measured speed value ($\omega_1$) of the rotation rate sensor results in the absolute vertical ($v_{z1,1}$) speed as the input variable to the control devices and/or regulating devices.

12. The device according to claim 11, characterized in that the respective measured value ($\omega_1$) of the rotation rate sensor is amplified by only a predeterminable factor ($L_1$).

13. The device according to claim 11, characterized in that the predeterminable factor can be derived from the minimum distance ($L_1$) of the longitudinal axis (Q) to a point ($P_1$) of the other system (4), the absolute vertical speed ($v_{z1,1}$) of which is determined.

14. The device according to claim 13, characterized in that the point ($P_1$) of the other system (4), the absolute vertical speed ($v_{z1,1}$) of which is determined, located at a respective edge of the other system (4) movable in the direction of the vertical axis (z).

15. The device according to claim 11, characterized in that the other system (4) is pivotably articulated at articulation points (6) on the one system (2) about the longitudinal axis (Q), and the damping system (8) is provided between the other system (4) and the one system (2).

16. The device according to claim 11, characterized in that at least an angular velocity ($\omega_1$, $\omega_2$) of the respective pitching motion of the other system (4) about the longitudinal (Q) can be detected by the respective rotation rate sensor.

17. The device according to claim 11, characterized in that the damping system (8) is formed as a semi-active or active spring-damper system.

18. The device according to claim 11, characterized in that the one system (2) is connected to the motion machine and the other system (4) is connected directly or indirectly to a cockpit that can be used by the operator for controlling the motion machine.

19. A working machine, in particular an agricultural machine, having a motion machine, having a cockpit, which can be used by an operator to control the motion machine, and having a device for decoupling vibrations between one system (2) assigned to the motion machine and another system (4) assigned to the cockpit, according to claim 11.

* * * * *